United States Patent [19]
Cooper

[11] 3,722,962
[45] Mar. 27, 1973

[54] DRIVE SPROCKET
[75] Inventor: Jerry W. Cooper, Waynesville, N.C.
[73] Assignee: Dayco Corporation, Dayton, Ohio
[22] Filed: Feb. 10, 1971
[21] Appl. No.: 114,311

[52] U.S. Cl. ............................305/35 EB, 74/243 R
[51] Int. Cl. ...............................................B62d 55/12
[58] Field of Search..........305/38, 37, 57, 56, 35 EB; 74/243 R; 301/63 DD; 180/5 R

[56] References Cited

UNITED STATES PATENTS

| 2,599,233 | 6/1952 | Christie | 305/57 X |
| 3,575,474 | 6/1968 | Russ | 305/35 EB |
| 1,542,625 | 6/1925 | MacGown | 180/5 A |
| 3,483,766 | 12/1969 | Erickson | 74/243 R X |
| 2,854,294 | 9/1958 | Bannister | 305/57 X |
| 3,404,745 | 10/1969 | Smieja | 305/35 EB |
| 3,054,300 | 9/1962 | Bowman | 305/58 X |

FOREIGN PATENTS OR APPLICATIONS

| 1,006,365 | 1/1952 | France | 305/38 |

Primary Examiner—Richard J. Johnson
Attorney—Reuben Wolk

[57] ABSTRACT

A drive sprocket for an endless traction belt which has a plurality of driven surfaces is provided wherein the sprocket has a plurality of driving members each supported for rotation relative to the sprocket and each being adapted to engage driven surfaces of the traction belt associated therewith in a serial manner to transmit a driving force thereto while avoiding sliding movement between each member and its associated driven surfaces to thereby reduce wear.

10 Claims, 4 Drawing Figures

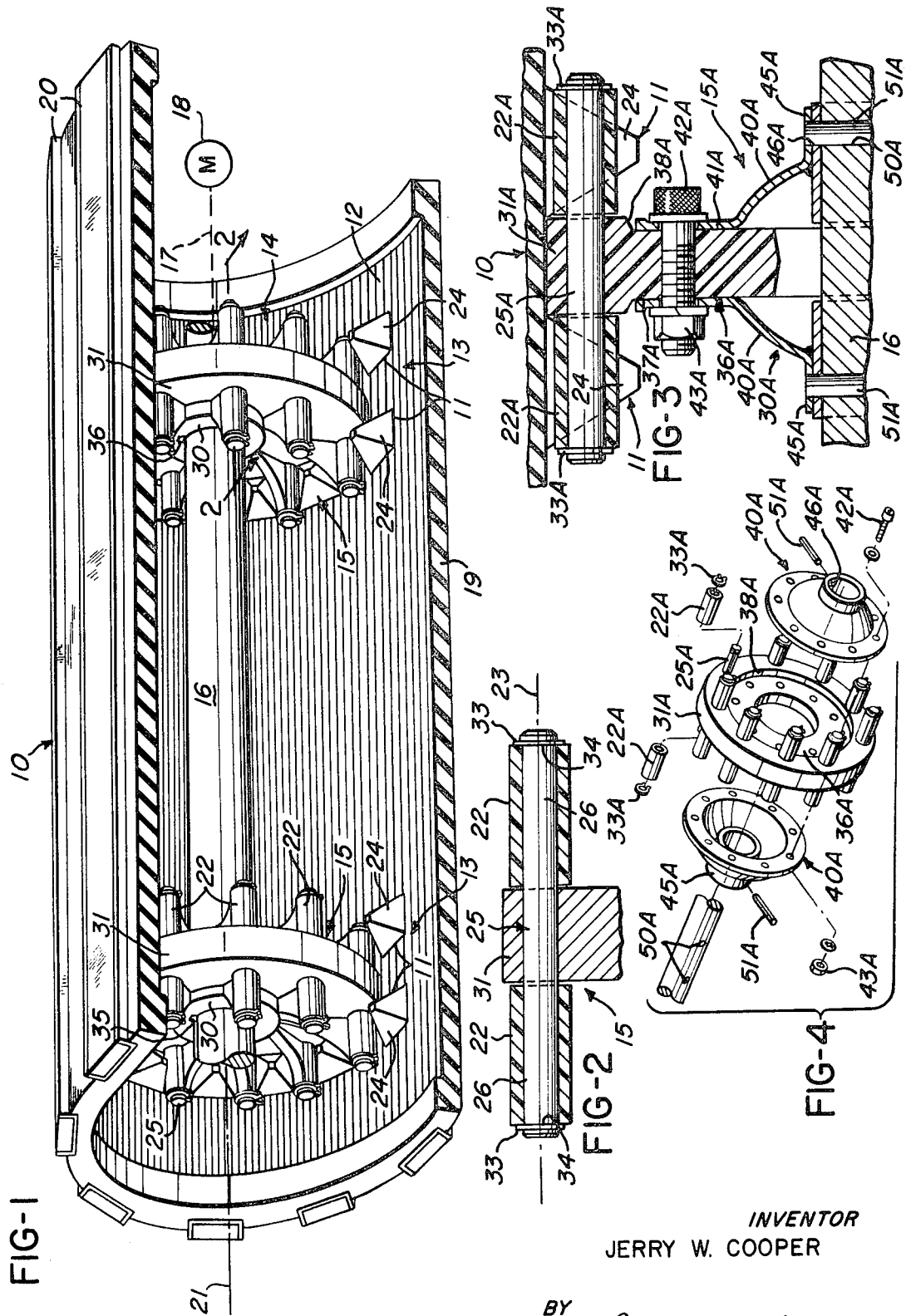

DRIVE SPROCKET

BACKGROUND OF THE INVENTION

Snowmobiles, tractors, and the like are often driven using endless traction belts which are driven in their endless paths by associated drive sprockets having fixed protrusions which either extend through cooperating aligned openings in an associated belt or these protrusions engage cooperating projections extending from the inside surface of an associated belt. However, these protrusions wear excessively because of the repeated rubbing which takes place as each protrusion is rotated into and out of driving engagement with a driven surface of an associated belt. In addition to wearing excessively these fixed protrusions tend to wear unevenly and require frequent replacement of the entire sprocket whereby it is necessary with these previous drive sprockets to remove the entire endless belt in order to remove and replace a worn sprocket having worn driving protrusions.

SUMMARY

This invention provides an improved drive sprocket of simple and economical construction which is particularly adapted for driving an endless traction belt and which has driving members which may be removed and installed without removal of the endless belt associated therewith or of the drive sprocket itself. The drive sprocket has a plurality of driving members each supported for rotation relative to the sprocket and each being adapted to engage driven surfaces of a traction belt associated therewith in a serial manner to transmit a driving force thereto while avoiding sliding movement between each member and its associated driven surfaces to thereby reduce wear.

Other details, uses, and advantages of this invention will be readily apparent from the exemplary embodiments thereof presented in the following specification, claims, and drawing.

BRIEF DESCRIPTION OF THE DRAWING

The accompanying drawing shows present preferred embodiments of this invention, in which FIG. 1 is a perspective view with parts in cross section and parts broken away illustrating an endless traction belt of the "inside-drive" type which is driven by a drive assembly employing a pair of exemplary drive sprockets made in accordance with this invention;

FIG. 2 is a fragmentary view taken essentially on the line 2—2 of FIG. 1;

FIG. 3 is an enlarged fragmentary view illustrating a fragmentary portion of the traction belt of FIG. 1 driven by another exemplary embodiment of a drive sprocket of this invention; and FIG. 4 is an exploded perspective view particularly illustrating the component parts of the drive sprocket of FIG. 3.

DESCRIPTION OF ILLUSTRATED EMBODIMENTS

Reference is now made to FIG. 1 of the drawing which illustrates an exemplary endless track or traction belt which is designated generally by the reference numeral 10 and such track is of the type which may be used on a vehicle such as a tractor, snowmobile, or the like. The belt 10 has a plurality of projections 11 extending from its inside surface 12 and each projection 11 is arranged in an associated row of a cooperating pair of parallel rows. The belt 10 of this example has two pairs of parallel rows of projections 11 with each pair being indicated generally at 13 and being arranged adjacent a side edge of the belt 10.

The belt 10 is particularly adapted to be driven by a drive sprocket assembly 14 comprised of a pair of identical drive sprockets 15 made in accordance with this invention and each drive sprocket 15 is fixed to a central shaft 16. The shaft 16 is driven by a mechanical drive connection indicated schematically by the dotted line 17 and connection 17 is suitably operatively connected to a drive motor assembly 18 of the vehicle which employs belt 10. The belt 10 has a main body portion 19 which may be made of any suitable material, such as natural or synthetic elastomeric material, any suitable polymer, such as polyurethane, or the like, and belt 10 has a plurality of cleats 20 extending across its full width.

The main body 19 may be suitably reinforced through the use of one or more longitudinal cords and may also employ suitable fabric layers.

Because the drive sprockets 15 are identical, only one of such sprockets will be described in detail, with it being understood that the description is fully applicable to both sprockets. In particular, the drive sprocket 15 has a central axis of rotation 21 which coincides with the central axis of the shaft 16 and the sprocket has a plurality of driving members 22 each supported for rotation relative to the sprocket 15 and about an associated axis of rotation 23 arranged substantially parallel to the central axis 21.

Each rotatable driving member 22 is adapted to engage associated driven surfaces 24 of projections 11 in a serial manner to transmit a driving force thereto and thereby drive the belt 10 in its endless path; and, because each member 22 is rotatable relative to its sprocket 15, sliding movement between member 22 and its driven surface 24 is avoided thereby substantially reducing wear not only of member 22 but also of the projections 11. In addition, because each member 22 is rotatable relative to its sprocket 15, different portions of its outside surface are brought into contact with driven surfaces 24 thereby eliminating any tendency to wear a particular part or area of the outside surface of member 22.

The sprocket 15 has a plurality of supports 25, also see FIG. 2, fixed thereto and each support carries an associated member 22 for rotation relative thereto. In this example, each support 25 of the sprocket 15 has two members 22 associated therewith, hence, each support 25 carries such two members on its opposite end portions 26.

The sprocket 15 has a hub portion 30 and a peripheral portion 31 surrounding the hub portion 30 and each of the supports 25 is in the form of a supporting rod having a right circular cylindrical outside surface and is fixed to the peripheral portion 31. Each member 22 is in the form of a right circular cylindrical sleeve-like member and is supported concentrically about its associated rod 25.

The sprocket 15 also has a plurality of retainers 33 each retaining a sleeve-like member 22 on its rod 25 to prevent the member 22 from sliding axially outwardly along the rod 25. Inward axial movement of member 22 is prevented by the inner end of member 22 striking an associated surface of peripheral portion 31.

The retainers 33 are in the form of snap-on retainers of conventional construction having a substantially U-shaped configuration and a pair of openings each provided in a leg of the U-shaped portion adjacent its outer end. These openings are adapted to receive pins of an associated tool to allow opening of the retainer and snapping such retainer in position within an associated groove 34 provided in rod 25 whereby the retainers 33 may be rapidly removed and installed to enable rapid removal and replacement of worn members 22. Depending upon the application, the retainers 33 may be of any other known construction such as retaining pins, etc., which lend themselves to rapid installation and removal.

The sprocket 15 may be made from a single piece of material with the hub portion 30 and peripheral portion 31 being defined as an integral part thereof. The sprocket 15 is held on the shaft 16 by a key 35 which is placed within a keyway 36 in the hub portion 30 which is aligned with a cooperating keyway in the shaft 16.

Another exemplary embodiment of a drive sprocket of this invention is illustrated in FIGS. 3 and 4 of the drawing. The sprocket illustrated in FIGS. 3 and 4 is very similar to the sprocket 15; therefore, such sprocket will be designated generally by the reference numeral 15A and parts of the sprocket 15A which are very similar to corresponding parts of the sprocket 15 will be designated by the same reference numeral as in the sprocket 15, also followed by the letter designation "A" and not described again. Only those component parts which are substantially different from corresponding parts of the sprocket 15 will be designated by a new reference numeral also followed by the letter designation "A" and described in detail. As in the case of sprocket 15, the sprocket 15A is particularly adapted to drive an endless belt such as the "inside type" traction belt with its projections 11 and driven surfaces 24.

The sprocket 15A has a peripheral portion 31A made in the form of a ring which will also be referred to as ring 31A and has annular cutouts on opposite sides thereof and each cutout is designated by the numeral 36A. Each cutout is defined by an annular planar surface 37A adjoined at its outer edge by a cylindrical surface 38A.

The hub portion 30A of the wheel 15A is comprised of a pair of roughly cup-shaped structures or shells each designated by the reference numeral 40A and each of the structures has an annular substantially planar peripheral flange 41A which is received within an associated cutout 36A of the peripheral ring 31A. Each flange 41A is fixed to the ring 31A by a plurality of threaded bolts 42A each having a cooperating nut 43A. Each bolt 42A extends through cooperating aligned openings in the flanges 41A and the ring 31A and upon threading an associated bolt 43A in position the ring is sandwiched between flanges 41A.

The ring 31A is preferably made of an elastomeric material such as a hard plastic using any suitable manufacturing technique. The ring 31A is preferably made by injection molding and the elongated right circular cylindrical rods 25A are preferably precisely fixed in the peripheral portion of the ring 31A by being molded in position whereby this technique enables the sprocket 15A to be constructed at a reduced cost.

The sprocket 15A also has means for attaching such sprocket to an associated shaft 16. In particular, it will be seen that each cup-shaped structure 40A has a tubular extension 45A extending outwardly therefrom and each extension has openings 46A provided therein. The openings 46A of each structure 40A are adapted to be aligned with a cooperating opening 50A in the associated shaft 16 and a pin 51A is inserted therethrough to hold sprocket 15A against movement relative to its shaft 16.

The main portion of sprocket 15 is shown and described as being made of metal with hub portion 30 and a peripheral portion 31 being made as an integral part of a single unit, while the main portion of sprocket 15A is shown as comprised of a hub portion 30A defined by a plurality of components which may be made of metal and a peripheral portion in the form of a ring 31A made of hard elastomeric material. However, it will be appreciated that the sprocket of this invention may be made using any desired number of components and of any suitable material. For example, such sprocket may be made of ferrous or nonferrous metals, elastomers, etc. In addition, the supports or rods 25 and 25A may be made of any suitable material (whether metallic or nonmetallic) which is capable of withstanding the forces imposed thereon. Preferably, these supports are made of steel.

The driving members 22 and 22A of the sprockets 15 and 15A respectively of this example are cross-hatched in the drawing as being made of an elastomeric material, such as plastic. However, it will be appreciated that such members may be made of any suitable material including, for example, polyethylene, urethane, aluminum, cast iron, etc. However, the material selected should exhibit satisfactory wear characteristics when used as a driving member to drive an endless track of the character disclosed herein. Also, the material selected should not unduly restrict free rotation of the member relative to its support.

Each of the elongated rods or supports 25 and 25A disclosed in this example of the invention extends through a peripheral portion of its associated sprocket and rotatably supports a pair of driving members in its opposite end portions. However, each support need not necessarily extend completely through the peripheral portion of its sprocket but may be in the form of an independent member which is suitably fixed in position in a cantilevered manner and rotatably supports a single member such as member 22. For example, a pair of members similar to the member 25 may have threaded inner end portions which may be threadedly received within cooperating threaded openings in the peripheral portion of an associated sprocket. A pair of such threaded members may be fastened in position along a common longitudinal axis so that the net effect would be to provide a pair of members 22, for example, each independently supported on an associated supporting rod 25 which function in the same manner as previously described. Also, with this threaded type construction, the supports 25 may be in the form of threaded bolts with each bolt head serving as a retainer similar in function to retainer 33.

The improved sprocket of this invention has been shown in connection with the belt 10 which is driven from its inside surface. However, it will be appreciated that the concept of utilizing a drive sprocket having a plurality of driving members which are rotatably supported thereon may be employed in drive sprockets wherein each rotatable member would extend partially through openings of an associated traction belt. Thus, a belt driven in this manner could still be driven in a positive manner yet wear would be reduced because sliding or rubbing contact between the driving members and the endless belt would be substantially eliminated. Also, each of these driving members would not tend to wear in only one area and could be replaced without removing the belt or sprocket from the vehicle on which it is installed.

While present exemplary embodiments of this invention, and methods of practicing the same, have been illustrated and described, it will be recognized that this invention may be otherwise variously embodied and practiced within the scope of the following claims.

What is claimed is:

1. A drive sprocket for an endless traction belt which has a plurality of driven surfaces, said sprocket having a central axis of rotation and comprising, a hub portion, a peripheral portion surrounding said hub portion, a plurality of elongated supports fixed to said peripheral portion, each of said supports extending completely through said peripheral portion and each having a longitudinal axis arranged parallel to said central axis, each of said supports being supported solely at its central portion by said peripheral portion, and a plurality of driving members rotatably supported relative to said supports and sprocket within the peripheral outline of said sprocket with each support carrying a pair of said members on its opposite end portions for rotation relative thereto, each member being adapted to engage those of said driven surfaces associated therewith in a serial manner to transmit a driving force thereto while avoiding sliding movement between each member and its associated driven surface and thereby reduce wear.

2. A sprocket as set forth in claim 1 in which each of said supports comprises a supporting rod and each member comprises a right circular cylindrical sleeve-like member rotatably supported concentrically about its associated rod.

3. A sprocket as set forth in claim 1 made from a single piece of material and having said hub portion and peripheral portion defined as an integral part thereof.

4. A sprocket as set forth in claim 1 in which said peripheral portion is made of a non-metallic material, each of said supports comprises a rod fixed within said nonmetallic material in an embedded manner, and each member comprises a cylindrical member rotatably supported concentrically about its associated rod.

5. A sprocket as set forth in claim 4 in which, said peripheral portion is in the form of a ring having an annular cutout on opposite sides thereof, said hub portion comprises a pair of roughly cup-shaped structures each having an annular substantially planar peripheral flange which is received within an associated cutout, and further comprising means fixing each flange against said ring.

6. A sprocket as set forth in claim 1 in which each support comprises a right circular cylindrical rod and each member comprises a right circular cylindrical sleeve rotatably supported concentrically about its rod.

7. A sprocket as set forth in claim 6 and further comprising a plurality of retainers each retaining an associated sleeve axially on its rod, and each retainer being easily installed on and removed from its rod to enable rapid installation of an associated member.

8. A sprocket as set forth in claim 6 in which each of said members is made of a plastic material.

9. A drive sprocket for an inside drive endless traction belt which has a plurality of projections extending from its inside surface with each projection being arranged in an associated row of a pair of parallel rows, said sprocket having a central axis of rotation and comprising, a hub portion, a peripheral portion surrounding said hub portion, a plurality of elongated supports fixed to said peripheral portion, each of said supports extending completely through said peripheral portion and each having a longitudinal axis arranged parallel to said central axis, each of said supports being supported solely at its central portion by said peripheral portion, and a plurality of driving members rotatably supported relative to said supports and sprocket within the peripheral outline of said sprocket with each support carrying a pair of said members on its opposite end portions for rotation relative thereto, each member being adapted to engage those projections arranged in a row associated therewith in a serial manner to transmit a driving force thereto while avoiding sliding movement between each member and a projection engaged thereby to thus reduce wear.

10. In combination: an endless traction belt which has a plurality of driven surfaces and a drive sprocket for driving said belt, said sprocket having a central axis of rotation and comprising, a hub portion, a peripheral portion made of hard plastic material surrounding said hub portion, a plurality of elongated supports fixed to said peripheral portion, each of said supports comprising a rod fixed within said plastic material in an embedded manner and extending completely through said peripheral portion and each having a longitudinal axis arranged parallel to said central axis, each of said supports being supported solely at its central portion by said peripheral portion, and a plurality of driving members each comprising a right circular cylindrical sleeve-like member rotatably supported concentrically about its associated rod relative to said supports and sprocket with each support carrying a pair of said members on its opposite end portions for rotation relative thereto, each member being adapted to engage those of said driven surfaces associated therewith in a serial manner to transmit a driving force thereto while avoiding sliding movement between said member and its associated driven surface and thereby reduce wear.

* * * * *